United States Patent [19]
Bold

[11] Patent Number: 5,424,011
[45] Date of Patent: Jun. 13, 1995

[54] STEAM HUMIDIFIER APPARATUS FOR TRACTORS TO SAVE GAS

[76] Inventor: Victor G. Bold, P.O. Box 205, Marcelin, Sask., Canada, S0J1R0

[21] Appl. No.: 231,928

[22] Filed: Apr. 25, 1994

[51] Int. Cl.⁶ .................................................. F02M 25/02
[52] U.S. Cl. .................................. 261/18.2; 123/25 P
[58] Field of Search ...................... 261/18.2; 123/25 P

[56] References Cited

U.S. PATENT DOCUMENTS

| | | | |
|---|---|---|---|
| 1,304,019 | 5/1919 | Brown | 261/18.2 |
| 4,336,773 | 6/1982 | Carouthers et al. | 123/25 P |
| 4,986,223 | 1/1991 | Mahoney | 123/25 P |
| 5,149,466 | 9/1992 | Megenbier | 123/25 P |

OTHER PUBLICATIONS

The Influence of Water Injection Upon Engine Performance, The Automobile Engineer, May 1920, pp. 190–192.

*Primary Examiner*—Tim Miles

[57] ABSTRACT

A steam humidifier apparatus for tractors to save gas comprising a container, the container being of a vertical orientation with a convex semi-cylindrical vertical surface at a first edge and a concave semi-cylindrical vertical surface at a second edge opposite from the first edge, with a closed bottom wall and a top wall having a threaded aperture therein; a support for the container, the support having a lower horizontal base and vertically extending sidewalls, the sidewalls including a concave semi-cylindrical vertical surface adapted to receive the convex semi-cylindrical vertical surface of the container, the sidewalls also having an opening for exposing the concave semi-cylindrical vertical surface of the container, the base also having a concave semi-cylindrical surface coextensive with the concave semi-cylindrical vertical surface of the container supported thereon; straps having first ends secured to the support adjacent to one free vertical edge at the opening and having second ends adapted to be removably received at the other free vertical edge of the opening; and a valve having a vertical pipe with threads at its lower end adapted to be received within the threads of the aperture in the top wall of the container, a closure member with a spring biassing closure member at the upper end of the vertical pipe, a supplemental horizontal pipe disposed in fluid communication with the vertical pipe for the passage of steam from the container.

3 Claims, 4 Drawing Sheets

STEAM HUMIDIFIER APPARATUS FOR TRACTORS TO SAVE GAS

BACKGROUND OF THE INVENTION

1. Field of the Invention

The present invention relates to a steam humidifier apparatus for tractors to save gas and more particularly pertains to improving gas mileage on tractors by using a device to create steam for injection into the air filter of the tractor.

2. Description of the Prior Art

The use of gasoline mileage improvement devices is known in the prior art. More specifically, gasoline mileage improvement devices heretofore devised and utilized for the purpose of improving gas mileage on tractors through various mechanisms are known to consist basically of familiar, expected, and obvious structural configurations, notwithstanding the myriad of designs encompassed by the crowded prior art which has been developed for the fulfillment of countless objectives and requirements.

The prior art discloses a large number of gasoline mileage improvement devices. By way of example, U.S. Pat. No. 3,927,627 to Brunn discloses a steam generating system and method utilizing exhaust gas recirculation.

U.S. Pat. No. 4,114,566 to Harpman discloses a hot fuel gas generator.

U.S. Pat. No. 4,685,426 to Kidaloski discloses a modular exhaust gas steam generator with common boiler casing.

U.S. Pat. No. 4,913,098 to Battaglini discloses a waste heat steam supercharger.

Lastly, U.S. Pat. No. 4,986,223 to Mahoney discloses an internal combustion engine injection superheated steam.

In this respect, the steam humidifier apparatus for tractors to save gas according to the present invention substantially departs from the conventional concepts and designs of the prior art, and in doing so provides an apparatus primarily developed for the purpose of improving gas mileage on tractors by using a device to create steam for injection into the air filter of the tractor.

Therefore, it can be appreciated that there exists a continuing need for a new and improved steam humidifier apparatus for tractors to save gas which can be used for improving gas mileage on tractors by using a device to create steam for injection into the air filter of the tractor. In this regard, the present invention substantially fulfills this need.

SUMMARY OF THE INVENTION

In view of the foregoing disadvantages inherent in the known types of gasoline mileage improvement devices now present in the prior art, the present invention provides an improved steam humidifier apparatus for tractors to save gas. As such, the general purpose of the present invention, which will be described subsequently in greater detail, is to provide a new and improved steam humidifier apparatus for tractors to save gas and methods which have all the advantages of the prior art and none of the disadvantages.

To attain this, the present invention essentially comprises a new and improved steam humidifier apparatus for tractors to save gas comprising, in combination, a container for the receipt of water to be heated and for the generation of steam upon being heated, the container being supported in a vertical orientation with a convex semi-cylindrical vertical surface at a first edge and a concave semi-cylindrical vertical surface at a second edge opposite from the first edge, with a closed bottom wall and a top wall having a threaded aperture therein, the container having about a two pint capacity and adapted to be filled three-fourths full for operation and use; a support for the container, the support having a lower horizontal base and vertically extending sidewalls, the sidewalls including a concave semi-cylindrical vertical surface adapted to receive the convex semi-cylindrical vertical surface of the container, the sidewalls also having an opening for exposing the concave semi-cylindrical vertical surface of the container, the base also having a concave semi-cylindrical surface coextensive with the concave semi-cylindrical vertical surface of the container supported thereon; straps having first ends secured to the support adjacent to one free vertical edge at the opening and having second ends adapted to be removably received at the other free vertical edge of the opening, the straps adapted to be releasably received around a vertically extending muffler of a tractor whereby heat from the muffler will heat the water in the container; a valve having a vertical pipe with threads at its lower end adapted to be received within the threads of the aperture in the top wall of the container, a closure member with a spring biassing closure member at the upper end of the vertical pipe to close the pipe and open the pipe for relieving steam within the container upon excessive pressure being generated within the container from the steam, a supplemental horizontal pipe disposed in fluid communication with the vertical pipe for the passage of steam from the container to an air filter of a tractor supporting the container; a third pipe having a threaded end and an associated nut adapted to be coupled to the air filter of a tractor supporting the container; and a flexible tube coupling the horizontal tube with the third tube whereby when a tractor supporting the container is run and heats its muffler, the water within the container is heated to generate steam for passage through the vertical pipe, horizontal pipe, tube and third pipe into the air filter for mixing with the gas being fed to the carburetor of the tractor to increase the operating efficiency and gas mileage of the motor of the tractor.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved steam humidifier apparatus for tractors to save gas which has all the advantages of the prior art gasoline mileage improvement devices and none of the disadvantages.

It is another object of the present invention to provide a new and improved steam humidifier apparatus for tractors to save gas which may be easily and efficiently manufactured and marketed.

It is a further object of the present invention to provide a new and improved steam humidifier apparatus for tractors to save gas which is of a durable and reliable construction.

An even further object of the present invention is to provide a new and improved steam humidifier apparatus for tractors to save gas which is susceptible of a low cost of manufacture with regard to both materials and labor, and which accordingly is then susceptible of low prices of sale to the consuming public, thereby making such a steam humidifier apparatus for tractors to save gas economically available to the buying public.

Still yet another object of the present invention is to provide a new and improved steam humidifier apparatus for tractors to save gas which provides in the apparatuses and methods of the prior art some of the advantages thereof, while simultaneously overcoming some of the disadvantages normally associated therewith.

Even still another object of the present invention is to improve gas mileage on tractors by using a device to create steam for injection into the air filter of the tractor.

Lastly, it is an object of the present invention to provide a steam humidifier apparatus for tractors to save gas comprising a container, the container being of a vertical orientation with a convex semi-cylindrical vertical surface at a first edge and a concave semi-cylindrical vertical surface at a second edge opposite from the first edge, with a closed bottom wall and a top wall having a threaded aperture therein; a support for the container, the support having a lower horizontal base and vertically extending sidewalls, the sidewalls including a concave semi-cylindrical vertical surface adapted to receive the convex semi-cylindrical vertical surface of the container, the sidewalls also having an opening for exposing the concave semi-cylindrical vertical surface of the container, the base also having a concave semi-cylindrical surface coextensive with the concave semi-cylindrical vertical surface of the container supported thereon; straps having first ends secured to the support adjacent to one free vertical edge at the opening and having second ends adapted to be removably received at the other free vertical edge of the opening; and a valve having a vertical pipe with threads at its lower end adapted to be received within the threads of the aperture in the top wall of the container, a closure member with a spring biassing closure member at the upper end of the vertical pipe, a supplemental horizontal pipe disposed in fluid communication with the vertical pipe for the passage of steam from the container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 2:
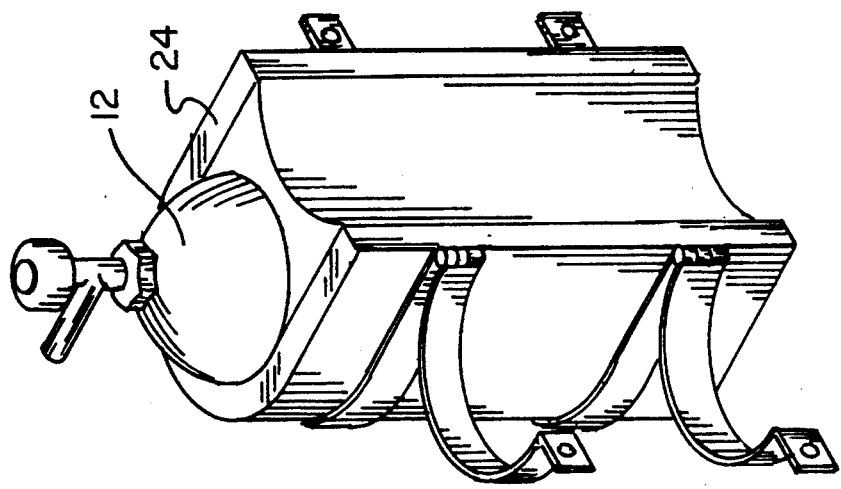
FIG. 2 is an enlarged perspective illustration of the new and improved steam humidifier apparatus constructed in accordance with the principles of the present invention.
Figure 1:
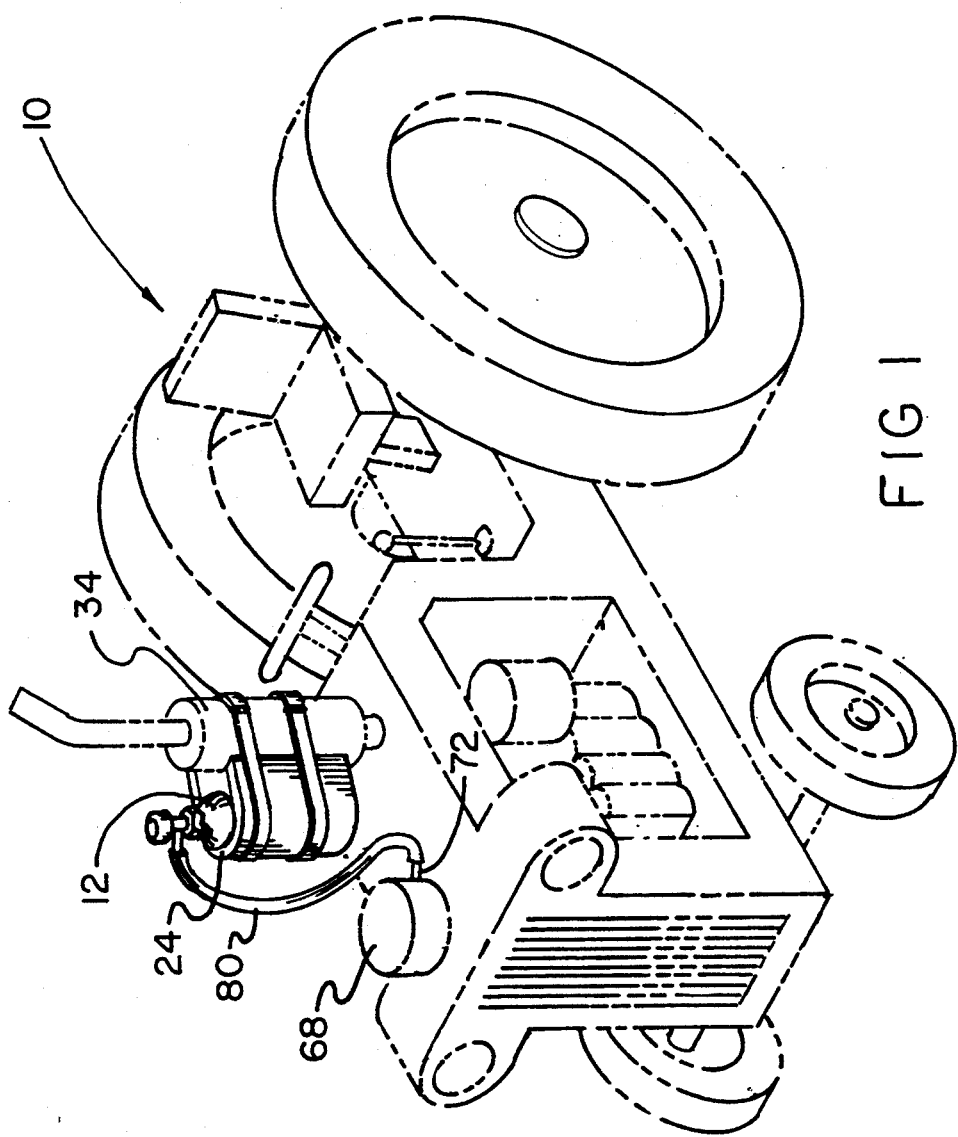
FIG. 1 is a perspective illustration of a tractor equipped with the new and improved steam humidifier apparatus for tractors to save gas constructed in accordance with the principles of the present invention.
Figure 3:
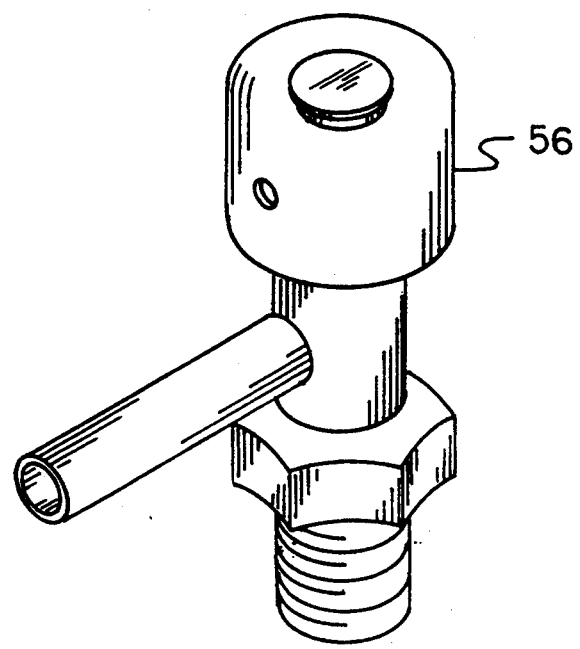
FIG. 3 is an enlarged perspective view of the upper portion of the device shown in FIGS. 1 and 2.
Figure 4:
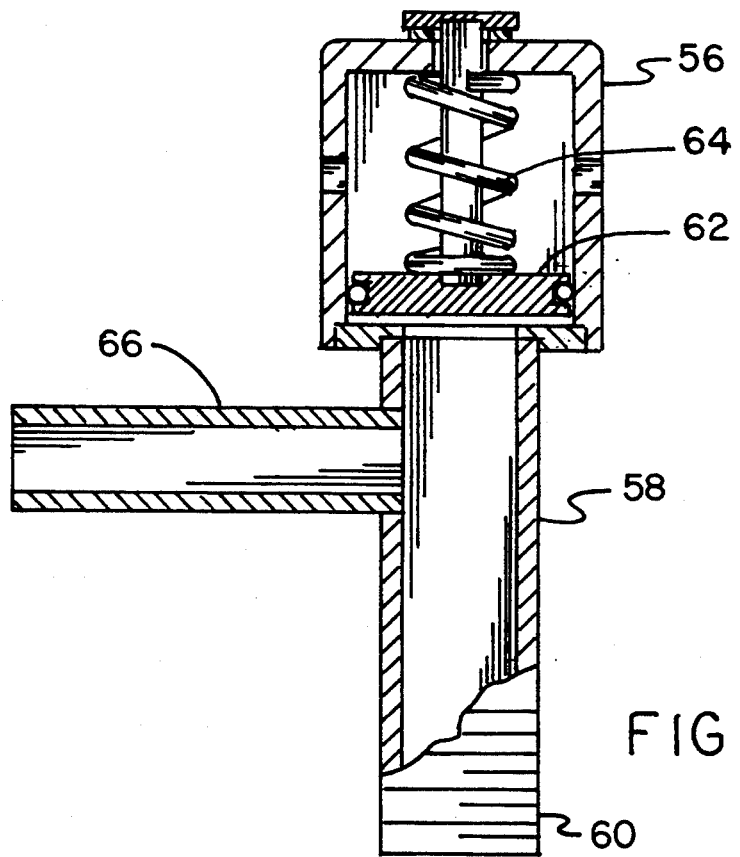
FIG. 4 is a cross-sectional view of the device shown in FIG. 3 taken vertically along the center line thereof.
Figure 5:
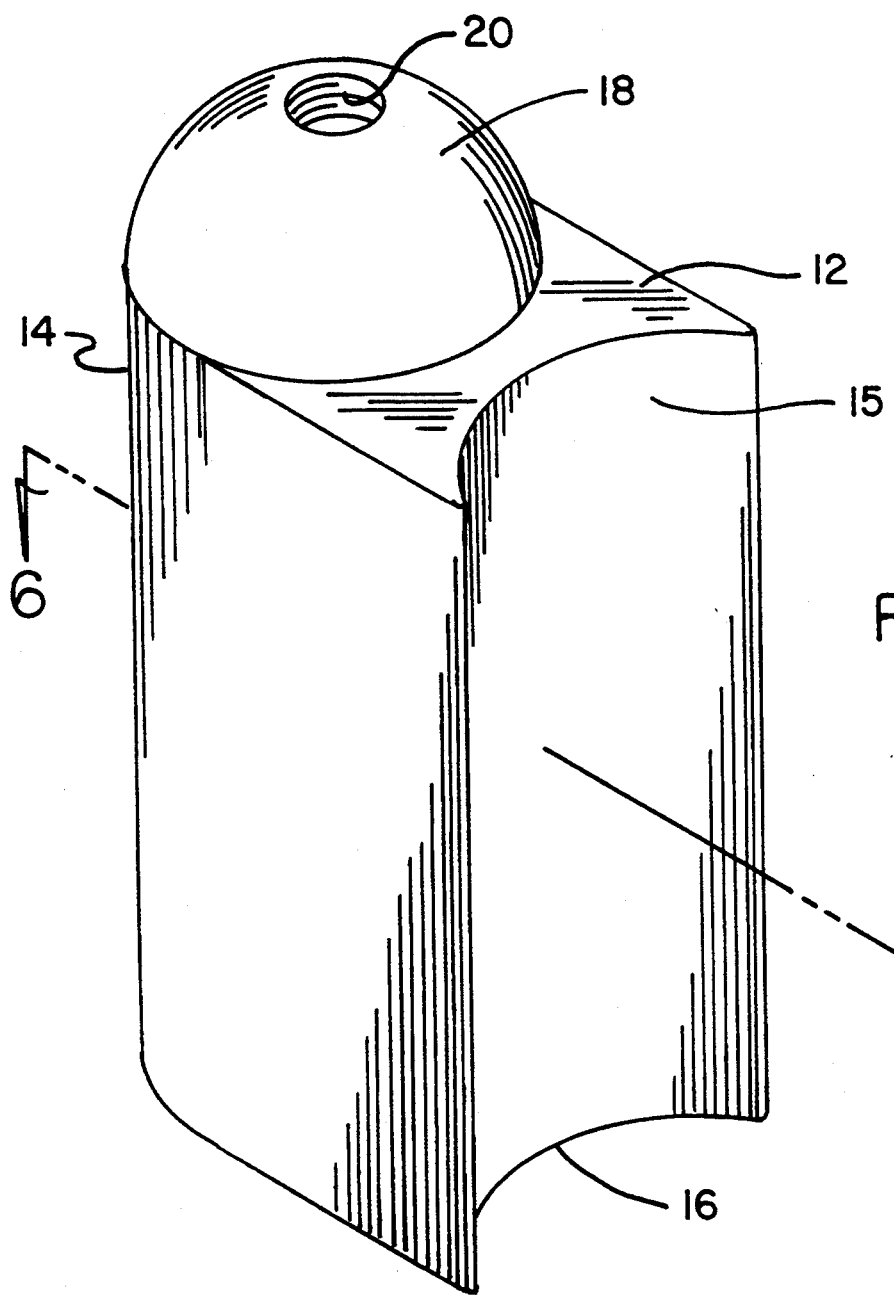
FIG. 5 is a enlarged perspective illustration of the water/steam supporting tank as illustrated in FIGS. 1 and 2.
Figure 6:
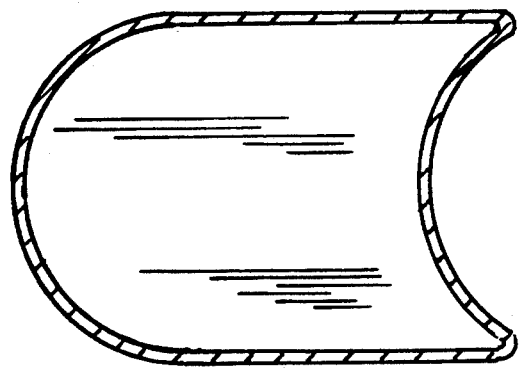
FIG. 6 is a cross-sectional view taken along line 6—6 of FIG. 5.
Figure 7:
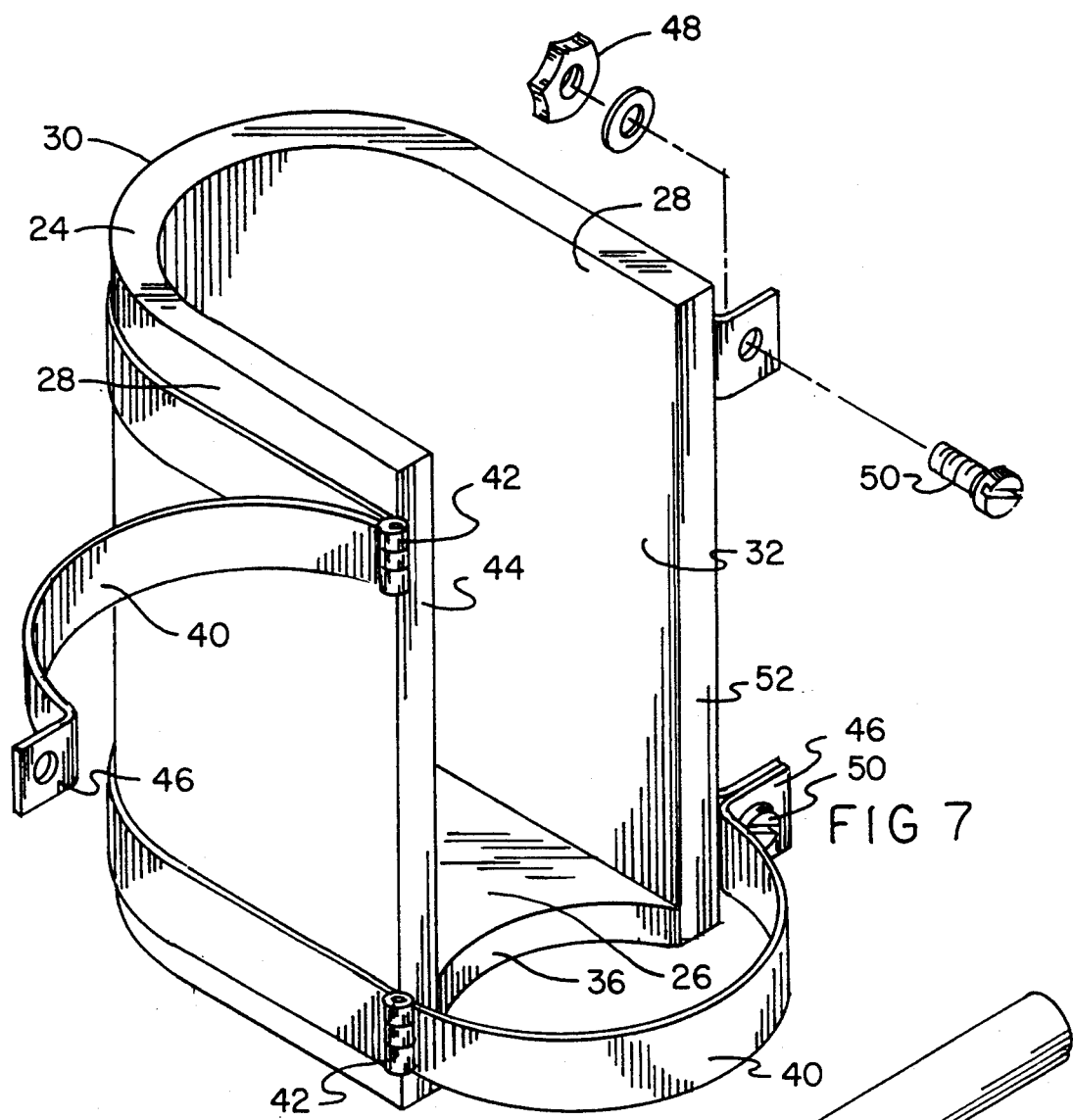
FIG. 7 is an enlarged perspective illustration of the tank support device illustrated in FIGS. 1 and 2.
Figure 8:
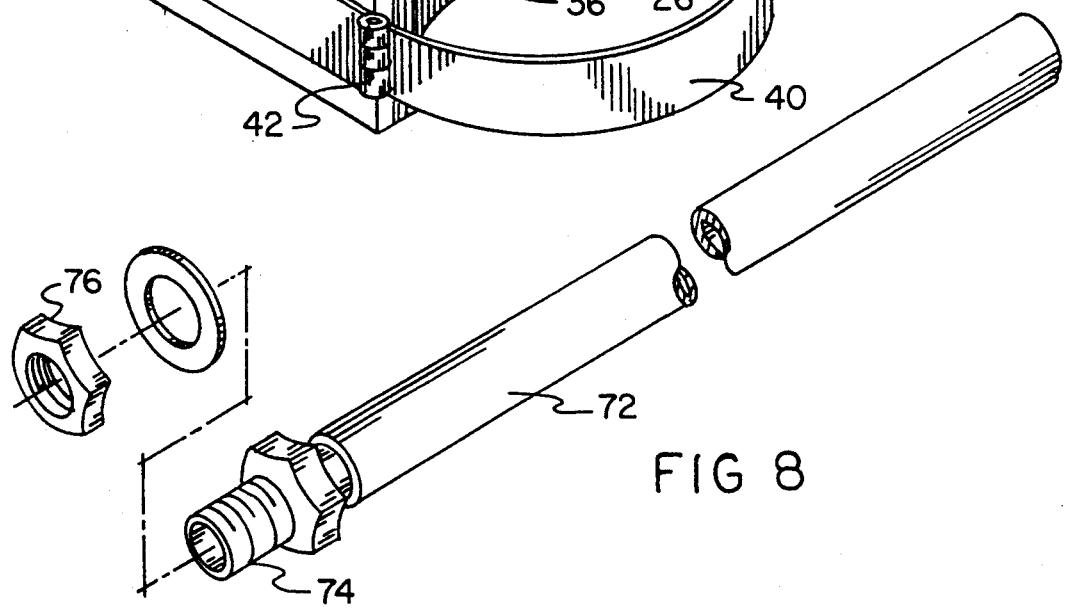
FIG. 8 is a perspective illustration of the device for coupling the tube to the air cleaner of the tractor.

With reference now to the drawings, and in particular to FIGS. 1 through 8 thereof, the preferred embodiment of the new and improved steam humidifier apparatus for tractors to save gas embodying the principles and concepts of the present invention and generally designated by the reference numeral 10 will be described.

The present invention, the new and improved steam humidifier apparatus for tractors to save gas includes, in its broadest context, a container for water, a support for the container, straps, a valve, a first vertical pipe, a second horizontal pipe, a third pipe and a flexible tube connecting the second and third pipes. Such components are individually configured and correlated with respect to each other to attain the desired objective.

More specifically, the central component of the system 10 is a container 12 for the receipt of water to be heated and converted to steam. The steam is generated upon the water in the container being heated by the muffler of a tractor upon which the container is supported. The container is supported in a generally vertical orientation. It has a convex, semi-cylindrical vertical wall 14 at a first edge and a concave, semi-cylindrical vertical surface 15 at a second edge opposite from the first edge. The container also has a closed bottom wall 16 and a top wall 18. Within the top wall is a threaded aperture 20. The container has about a two pint capacity and when prepared for operation and use, the container is filled to about three-fourths capacity.

In physical association with the container is a support 24. The support has a lower horizontal base 26 and vertically extending side walls 28. The side walls include a concave, semi-cylindrical vertical surface 30. Such surface is adapted to receive and mate with the convex, semi-cylindrical vertical surface of the container. The side walls also have an opening 32 for exposing the concave, semi-cylindrical vertical surface of the container which is adapted to be placed in physical, heat-transferring contact with the muffler 34. In addition, the base also has a concave, semi-cylindrical surface 36 coextensive with the concave, semi-cylindrical vertical surface of the container supported thereon as well as the muffler of the tractor.

In association with the support are a pair of straps 40. Each strap has a first end 42 secured to the support adjacent to one free vertical edge 44 at the opening of the support. Each strap also has a second end 46 adapted to be removably received as by nuts 48 and bolts 50 at the other free vertical edge 52 of the opening. The straps are preferably curved metal members adapted to be releasably received around the vertical extending muffler of the tractor. With such association of the muffler to the container, heat from the muffler will heat the water within the container.

Next provided is a valve 56. The valve has a vertical first pipe 58 with threads at its lower end 60 adapted to be received by the threads of the aperture in the top wall of the container. A closure member 62 in the form of a disk with a peripheral O-ring functions with a spring 64 biassing the closure member into contact with the upper end of the vertical pipe. This action of the spring functions to close the pipe. The spring, however, allows the opening of the pipe for relieving the steam within the container upon excess pressure having been generated within the container through the creation of steam. In addition, a supplemental horizontal second pipe 66 is disposed in fluid communication with the vertical first pipe. This allows for the passage of steam from the container to the air filter 68 of a tractor supporting the container.

Located at the air filter of the tractor supporting the container is third pipe 72. The third pipe has a threaded end 74 and an associated nut 76 adapted to be coupled to the air filter through an aperture therein.

Lastly, a flexible tube 80 is provided for coupling the horizontal second tube with the third tube. In this manner, when a tractor supporting the container is run and heats its muffler, the water within the container is heated to generate steam which passes through the vertical first pipe, the horizontal second pipe, the tube and then the third pipe into the air filter. Such steam is mixed with the gas being fed to the carburetor of the tractor. This functions to increase the operating efficiency and gas mileage of the motor of the tractor.

The present invention creates steam that is used to save gasoline when operating a farm tractor. Farm tractors are the workhorses on a farm, sometimes operating days on end. Even a small savings in gasoline adds up quickly.

The present invention has a two pint aluminum container with an insulated jacket surrounding it, except for one side that is open. At the top of the container is a release valve for releasing excess steam. One end of a one-fourth inch rubber hose is attached to a steam outlet at the top of the container and the other end is attached to the intake of the air cleaner. An adjustment valve is installed on the hose about one inch away from the intake, and is used to regulate the amount of steam by spacing the steam intake closer to or further away from the air intake.

The present invention is fastened to the tractor's vertical muffler with steel clamps, with the open uninsulated side against the muffler. The container is about three-quarters filled with water, and the rubber hose is attached to the outlet at the top of the tank and to the intake of the air cleaner. Both the muffler and air cleaner are located above the motor. As the tractor is driven, the hot muffler causes the water to boil, creating steam. The steam if forced through the rubber hose and into the air cleaner's intake, thus increasing the gas mileage of the tractor. Farmers everywhere should appreciate the benefits derived from the present invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved steam humidifier apparatus for tractors to save gas comprising, in combination:

a container for the receipt of water to be heated and for the generation of steam upon being heated, the container being supported in a vertical orientation with a convex semi-cylindrical vertical surface at a first edge and a concave semi-cylindrical vertical surface at a second edge opposite from the first edge, with a closed bottom wall and a top wall having a threaded aperture therein, the container having about a two pint capacity and adapted to be filled three-fourths full for operation and use;

a support for the container, the support having a lower horizontal base and vertically extending sidewalls, the sidewalls including a concave semi-cylindrical vertical surface adapted to receive the convex semi-cylindrical vertical surface of the container, the sidewalls also having an opening for exposing the concave semi-cylindrical vertical surface of the container, the base also having a concave semi-cylindrical surface coextensive with the concave semi-cylindrical vertical surface of the container supported thereon;

straps having first ends secured to the support adjacent to one free vertical edge at the opening and having second ends adapted to be removably received at the other free vertical edge of the opening, the straps adapted to be releasably received around a vertically extending muffler of a tractor whereby heat from the muffler will heat the water in the container;

a valve having a vertical pipe with threads at its lower end adapted to be received within the threads of the aperture in the top wall of the container, a closure member with a spring biassing closure member at the upper end of the vertical pipe to close the pipe and open the pipe for relieving steam within the container upon excessive pressure being generated within the container from the steam, a supplemental horizontal pipe disposed in fluid communication with the vertical pipe for the passage of steam from the container to an air filter of a tractor supporting the container;

a third pipe having a threaded end and an associated nut adapted to be coupled to the air filter of a tractor supporting the container; and a flexible tube coupling the horizontal tube with the third tube whereby when a tractor supporting the container is run and heats its muffler, the water within the container is heated to generate steam for passage through the vertical pipe, horizontal pipe, tube and third pipe into the air filter for mixing with the gas being fed to the carburetor of the tractor to increase the operating efficiency and gas mileage of the motor of the tractor.

2. A steam humidifier apparatus for tractors to save gas comprising:

a container, the container being of a vertical orientation with a convex semi-cylindrical vertical surface at a first edge and a concave semi-cylindrical vertical surface at a second edge opposite from the first edge, with a closed bottom wall and a top wall having a threaded aperture therein;

a support for the container, the support having a lower horizontal base and vertically extending sidewalls, the sidewalls including a concave semi-cylindrical vertical surface adapted to receive the convex semi-cylindrical vertical surface of the container, the sidewalls also having an opening for exposing the concave semi-cylindrical vertical surface of the container, the base also having a concave semi-cylindrical surface coextensive with the concave semi-cylindrical vertical surface of the container supported thereon;

straps having first ends secured to the support adjacent to one free vertical edge at the opening and having second ends adapted to be removably received at the other free vertical edge of the opening; and a valve having a vertical pipe with threads at its lower end adapted to be received within the threads of the aperture in the top wall of the container, a closure member with a spring biassing closure member at the upper end of the vertical pipe, a supplemental horizontal pipe disposed in fluid communication with the vertical pipe for the passage of steam from the container.

3. The apparatus as set forth in claim 2 and further including:

a third pipe having a threaded end and an associated nut; and a flexible tube coupling the horizontal tube with the third tube.

* * * * *